M. R. MARCELL
Churn.
No. 21,010.
Patented July 27, 1858.
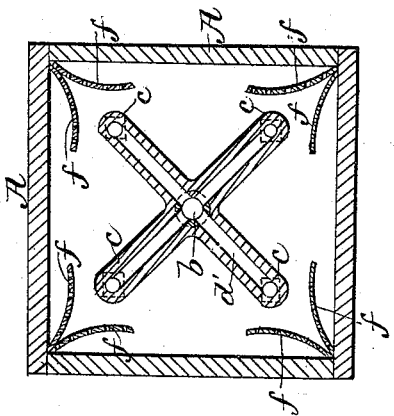
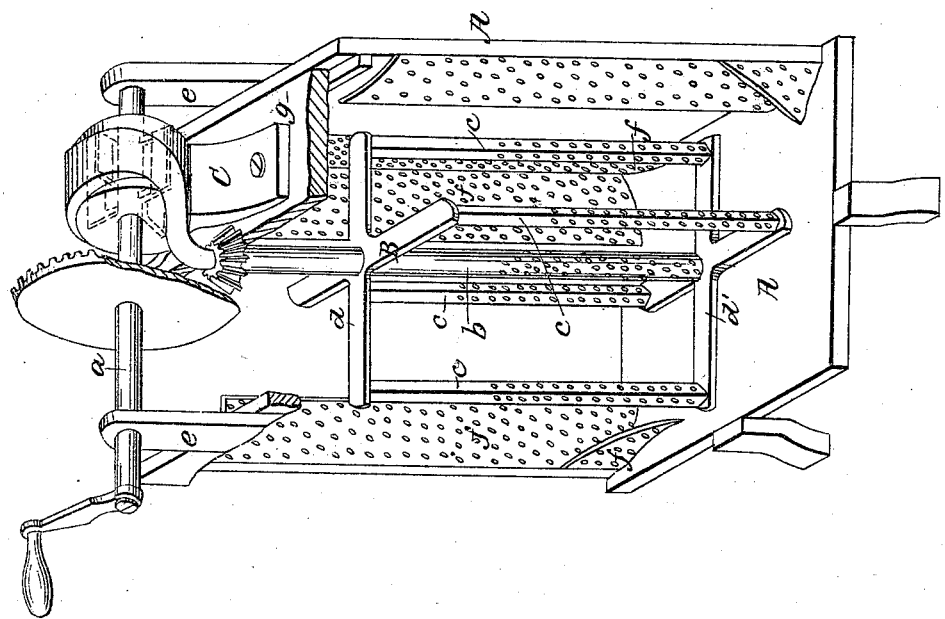

UNITED STATES PATENT OFFICE.

M. R. MARCELL, OF DANSVILLE, NEW YORK.

CHURN.

Specification of Letters Patent No. 21,010, dated July 27, 1858.

*To all whom it may concern:*

Be it known that I, M. R. MARCELL, of Dansville, Livingston county, State of New York, have invented certain new and useful Improvements in Churns, of which the following is a full, clear, and exact description, reference being had to the accompanying drawings, forming part of this specification, in which—

Figure 1 represents a perspective view of a churn embracing my improvements, with two sides removed in order to show the interior, and Fig. 2 represents a plan of the interior of the same showing the arrangement of the curved corner plates.

Butter consists mainly of an aggregation of the fatty globules contained in milk, which by the process of churning are broken, when they separate from the water and other parts of the milk and unite with each other. Before this takes place the sugar of milk (one of the component parts of milk) is converted into lactic acid the temperature of the milk rises which expands the oil globules so that the agitation produced by the motion of the dasher causes them to burst the thin shell in which they are enveloped and allows them to concrete. Experiments have proved that in bringing the milk intimately in contact with atmospheric air it sooner becomes acid at the temperature it should not exceed to make good butter, and that in agitating the milk if cross currents are produced which react upon each other the oil globules are broken with greater facility and the butter made in less time and with less labor.

To effect this, is the object of my improvements in churns, and my invention for effecting these objects consists, first, in throwing a current of atmospheric air through the dasher shaft into the churn, and causing it to issue in fine jets from the dasher shaft and also from the wings of the dasher before the surface of the cream or milk in the churn by puncturing both the hollow dasher shaft and wings with small holes below the surface of the fluid in the churn, by which means the mingling of the atmospheric air with the whole mass of the fluid in the churn is more rapid, the conversion of the sugar of milk into lactic acid and the formation of butter facilitated; second, in arranging in a churn a series of double, punctured and curved plates which are united at the exterior angle with their convex surfaces toward each other and facing the center of the churn so that the convex surface of one plate forms the deflecting surface of the fluid passing through the openings of the adjacent plate, whereby the mechanical action on the fluid is increased by its impinging when in a state of division on a deflecting surface, thus facilitating the breaking of the oil globules in the milk and the rapid formation of butter.

In the accompanying drawing a churn embracing my improvements is represented and it consists of a rectangular churn box (A) with a rotary dasher-wheel (B), and a fan blower (C) for throwing a current of air through the dasher into the churn. The dasher is operated by said gearing and the driving shaft ($a$) is supported by brackets ($e$) on the side of the churn box. The fan case surrounds the driving shaft ($a$) and rests on the churn cover, and the mouth of the blower enters the upper end of the hollow dasher shaft ($b$). The vanes of the fan ($c$) are attached to and receive their motion from the driving shaft.

To the dasher shaft is attached two sets of horizontal arms ($d$ $d'$) which are connected at the ends by hollow wings ($c$) of any proper form to agitate the milk. The lower set of arms ($d'$) are hollow and form a tubular connection between the dasher and wings for the passage of the air from the blower to the wings.

The lower part of the shaft ($b$) as well as the wings ($c$) is punctured with small holes to about the ordinary level of the milk or cream in the churn that they may be always submerged in churning and that the air thrown in by the blower will only escape by passing through the cream.

In the interior of the churn and at each corner are two metallic curved plates ($f$) which unite at the angle of the corner curve to the right and left, and extend out toward the center of the churn so as to just admit the dasher turning without touching them. These plates are punctured full of holes of sufficient size to allow the cream which is thrown against them by the motion of the dasher to pass through freely.

When motion is communicated to the driving shaft a current of air is thrown by the blower through the dasher shaft, and issues in fine jets from the shaft and wings of the dasher beneath the surface of the cream or milk in the churn. The rotary motion of the dasher throws the milk against the concave surface of the corner plates and as it passes through the openings it is divided into small streams, thus becomes intimately mingled with the jets of air issuing from the dasher, so that the whole mass is in a very short space of time subjected to the action of atmospheric air by which the conversion of the sugar of milk into lactic acid is greatly facilitated. As the milk passes through the openings in the plates it is divided into jets, and in this state of division it impinges on the convex surface of the adjacent plate and is deflected toward the center of the churn, thereby increasing the mechanical action on the fluid and thus facilitating the breaking of the oil globules in the milk. The fluid is deflected from the convex surface of the plate on which it impinges in the same manner as in other churns in which the deflecting plate is used, and the same effect produced. This action is produced by revolving the dasher in either direction as the plates curve both to the right and left.

I do not confine myself to the precise position or arrangement of the fan blower as it may be placed on the side instead of the top of churn and connected with the driving shaft by bevel or spur gearing.

Having thus described my improvements in churns what I claim therein as new and desire to secure by Letters Patent is—

1. In combination with the blower I claim the dasher constructed substantially as described, whereby a current of air blown through the dasher shaft is caused to issue from the dasher below the surface of the fluid in the churn in fine jets for the purpose set forth.

2. The double deflecting plates constructed substantially as described in combination with a churn box, for the purpose as herein set forth.

In testimony whereof I have subscribed my name.

M. R. MARCELL.

Witnesses:
C. R. KERN,
WILLIAM R. SHARP.